United States Patent [19]
George

[11] 3,865,570
[45] Feb. 11, 1975

[54] PLANT GROWTH STUNTING PROCESS
[75] Inventor: Edwin Francis George, Eversley; William Duncan Riddell, Windsor, both of England
[73] Assignees: Imperial Chemical Industries Limited, London, England
[22] Filed: Feb. 13, 1973
[21] Appl. No.: 332,221

[52] U.S. Cl.............................. 71/76, 71/88, 71/90, 71/92, 260/247.1, 260/247.2 A, 260/247.2 B, 260/250 R, 260/290 HL, 260/294.8 D, 260/294.9, 260/295 R, 260/295 CA, 260/302 H, 260/308 D
[51] Int. Cl........................... A01n 5/00, A01n 9/22
[58] Field of Search................................ 71/76, 92

[56] References Cited
UNITED STATES PATENTS
3,155,488  11/1964  Lutz et al................................. 71/92
3,166,400  1/1965   Lutz et al................................. 71/92
3,666,435  5/1972   Price et al................................ 71/76
3,725,030  4/1973   Newallis et al. ......................... 71/76

OTHER PUBLICATIONS
Buckler et al., "Synthesis & Antiinflammatory Activity, etc.;" (1969) J. Med. Chem. 13 pp. 725–29 (1970).

Primary Examiner—Glennon H. Hollrah
Attorney, Agent, or Firm—Cushman, Darby & Cushman

[57] ABSTRACT

A method of regulating the growth of plants, which comprises applying to the plants a compound of the formula:

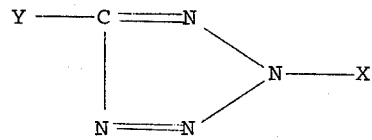

wherein Y is an aryl or heterocyclic group, optionally substituted, and X represents a hydrogen atom, a hydroxyalkyl group, a carboxylate ester group or a carboxyalkyl group, or a salt, ester, amide or nitrile thereof.

7 Claims, No Drawings

PLANT GROWTH STUNTING PROCESS

This invention relates to methods of regulating the growth of plants, to plant growth regulating compositions, and to chemical compounds having plant growth regulating properties.

According to the present invention, there is provided a method of regulating the growth of plants, which comprises applying for uptake by the plants a compound of the formula:

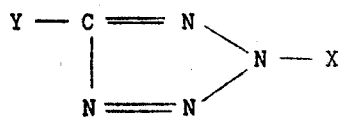

wherein Y is an aryl or heterocyclic group, optionally substituted, and X represents a hydrogen atom, a carboxylate ester group, a hydroxyalkyl group or a carboxyalkyl group, or a salt, ester amide or nitrile thereof.

Y may be an aryl group, particularly a phenyl group, or a heterocyclic group, for example a pyridyl or pyrrole, morpholyl, thiazolyl, diazinyl or furyl group.

Suitable substituents for Y include alkyl substituents, for example $C_1$ to $C_4$ alkyl groups, optionally substituted with halogens; halogen substituents, for example chlorine, bromine, iodine or fluorine; the cyano group; and the nitro group.

Preferred compounds for use in the process of the invention are those in which Y is a phenyl ring bearing a substituent in the 4-position. Particularly preferred compounds are those in which the 4-substituent is chlorine or fluorine.

Examples of carboxyalkyl groups are those having from 2 to 5 carbon atoms, for example the carboxymethyl, 2-carboxyethyl, and 1-carboxyethyl groups. Examples of carboxylate esters include those in which X is $CO.OCH_3$, $CO.OC_2H_5$, $CO.OC_6H_5$ and $CO.O.CH_2C_6H_4Cl(p)$.

Examples of suitable salts of compounds in which X is hydrogen or a carboxyalkyl group are salts formed from alkali metals, for example sodium or potassium, alkaline earth metals, for example magnesium and calcium, and salts with organic bases, for example mono-, di- or trialkylamines for example such amines wherein the one, two or three alkyl radicals each contain up to 4 carbon atoms, for example, methylamine, diethylamine and triethylamine. Suitable esters of compounds in which X is a carboxyalkyl group include esters of the carboxy function with an alcohol of up to 6 carbon atoms, for example a methyl, ethyl, phenyl or 2-chlorobenzyl ester.

Particular examples of compounds useful in the process of the invention are listed below in Table I.

TABLE I

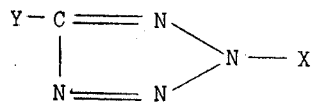

| Compound No. | Y | X | Melting point °C |
|---|---|---|---|
| 1 | $C_6H_5-$ | H | 213-215 decomp. |
| 2 | $pCl.C_6H_4-$ | H | 258 |
| 3 | $mCl.C_6H_4-$ | H | 138-139 |
| * 4 | $oF.C_6H_4-$ | H | 160-162 |
| 5 | $mF.C_6H_4-$ | H | 146-148 |
| 6 | $pF.C_6H_4-$ | H | 208-210 |
| 7 | $pNO_2.C_6H_4-$ | H | 214-216 decomp. |
| 8 | 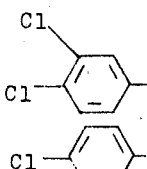 | H | 161-163 |
| * 9 | 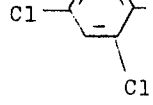 | H | 163-165 decomp. |

TABLE I—Continued

| Compound No. | Y | X | Melting point °C |
|---|---|---|---|
| 10 | pBr.C$_6$H$_4$- | H | 245-246 decomp. |
| 11 | mCl.C$_6$H$_4$- | -CH$_2$CH$_2$CO$_2$H | 119-120 |
| 12 | pCl.C$_6$H$_4$- | -CH$_2$CH$_2$CO$_2$H | 151 |
| 13 | pCl.C$_6$H$_4$- | -CH$_2$CO$_2$H | 215-217 |
| 14 | pCl.C$_6$H$_4$- | -CH$_2$CO$_2$C$_2$H$_5$ | 100-102 |
| * 15 | pCl.C$_6$H$_4$- | -CH(CH$_3$)CO$_2$H | 162-165 |
| * 16 | p-Cl.C$_6$H$_4$- | -CH$_2$CH$_2$CO$_2$C$_2$H$_5$ | 45-47 |
| * 17 | oF.C$_6$H$_4$- | -CH$_2$CO$_2$C$_2$H$_5$ | 55-56 |
| * 18 | mF.C$_6$H$_4$- | -CH$_2$CO$_2$H | 196-198 |
| * 19 | mF.C$_6$H$_4$- | -CH$_2$CO$_2$C$_2$H$_5$ | 70.5-72.5 |
| * 20 | pF.C$_6$H$_4$- | -CH$_2$CO$_2$C$_2$H$_5$ | 93-96 |
| 21 | 3,4-diCl-C$_6$H$_3$- | -CH$_2$CO$_2$C$_2$H$_5$ | 99-101 |
| 22 | mCH$_3$C$_6$H$_4$- | -CH$_2$CH$_2$CO$_2$H | 87-89 |
| *23 | pCl.C$_6$H$_4$- | -COOC$_2$H$_5$ | 72-73 |
| 24 | pClC$_6$H$_4$- | -CH$_2$CONH$_2$ | 235 decomp. |
| 25 | 2,6-diCl-C$_6$H$_3$- | H | 210-212 |
| 26 | 2-furyl | -H | 199-200 |
| * 27 | 6-Cl-2-pyridyl | -H | 132-135 |
| 28 | 6-Cl-2-pyridyl | -CH$_2$COOC$_2$H$_5$ | 74-76 |

TABLE I—Continued

| Compound No. | Y | X | Melting point °C |
|---|---|---|---|
| 29 | p.CN.C$_6$H$_4$- | -H | 190 |
| 30 | m.CN.C$_6$H$_4$- | -H | 145 |
| 31 | p.CN.C$_6$H$_4$- | -CH$_2$COOC$_2$H$_5$ | 109-112 |
| 32 | m.CN.C$_6$H$_4$- | -CH$_2$COOC$_2$H$_5$ | 30 |
| 33 | p.ClC$_6$H$_4$- | -CH$_2$COOCH$_3$ | 109-111 |
| *  34 | pCl.C$_6$H$_4$- | -CH$_2$COO.CH$_2$CH$_2$CH$_3$ | 71-74 |
| *  35 | pCl.C$_6$H$_4$- | -CH$_2$COOC$_4$H$_9$(iso) | 67-70 |
| *  36 | pCl.C$_6$H$_4$- | -CH(CH$_3$).CH$_2$COOCH$_3$ | 35 |
| *  37 | pCl.C$_6$H$_4$- | -CH$_2$.CH$_2$OH | 107-109 |
| *  38 | pCl.C$_6$H$_4$- | -CH$_2$CN | 109-110 |
| *  39 | pCl.C$_6$H$_4$- | -CH$_2$.CH$_2$CH$_2$.COOC$_2$H$_5$ | 30 |
| *  40 | pCF$_3$C$_6$H$_4$- | -H | 218-219 |
| *  41 | p.CF$_3$.C$_6$H$_4$- | -CH$_2$.COO.C$_2$H$_5$ | 82-84 |
| *  42 | pCl.C$_6$H$_4$- | -CH$_2$.COO$^-$.H$_3$N$^+$.CH$_2$.CH$_2$OH | 163-165 |
| *  43 | p.Cl.C$_6$H$_4$- | -CH$_2$.COO$^-$.HN$^+$.(C$_2$H$_5$)$_3$ | 96-101 |
| 44 | C$_6$H$_5$ | -CH$_2$CO$_2$C$_2$H$_5$ | 78-79 |
| 45 | C$_6$H$_5$ | -CH$_3$ | 50 |
| 46 | oCl.C$_6$H$_4$- | -H | 166-168 |
| 47 | pCH$_3$C$_6$H$_4$- | -H | 261-262 |
| 48 | mCl.C$_6$H$_4$- | -CH$_2$CO$_2$C$_2$H$_5$ | 74-77 |
| *  49 | pBr.C$_6$H$_4$- | -CH$_2$CO$_2$C$_2$H$_5$ | 106-110 |
| *  50 | pCl.C$_6$H$_4$- | -CH$_2$CONHC$_{12}$H$_{25}$ | 155 |
| *  51 | pCl.C$_6$H$_4$- | -CH$_2$CON(C$_2$H$_5$)$_2$ | 139-141 |

New compounds in the above table are indicated by an asterisk.

In carrying out the process of the invention the compounds of the foregoing formulae are preferably applied in the form of compositions, in which the active ingredient is mixed with a diluent or carrier. The compounds may be applied for uptake by the plant either by bringing them directly into contact with the plant foliage (e.g. by spraying) or by introducing them into the soil in which the roots of the plants grow, e.g. as a dressing on seeds.

In another aspect, therefore, the invention provides plant growth regulating compositions comprising as an active ingredient a compound of the foregoing formula in admixture with a carrier comprising a diluent containing a surface active agent.

Solid compositions may be in the form of dusting powders or granules, wherein the active ingredient is mixed with a finely divided solid diluent. Suitable solid diluents include kaolin, bentonite, kieselguhr, dolomite, calcium carbonate, talc, powdered magnesia, Fuller's earth, and gypsum. Solic compositions may also be in the form of dispersible powders or grains, comprising, in addition to the active ingredient, a wetting agent to facilitate the dispersion of the powder or grains in liquid or seed dressings.

In general liquid compositions are preferred for foliar application, since they are more convenient to use.

Liquid compositions include aqueous solutions, dispersions or emulsions containing the active ingredient together with one or more surface-active agents such as wetting agents, dispersing agents, emulsifying agents, or suspending agents.

Surface-active agents may be of the cationic, anionic, or non-ionic type. Suitable agents of the cation type include, for example, quaternary ammonium compounds, for example cetyltrimethylammonium bromide. Suitable agents of the anionic type include, for example, soaps; salts of aliphatic mono esters of sulphuric acid, for example sodium lauryl sulphate; and salts of sulphonated aromatic compounds, for example sodium dodecylbenzenesulphonate, sodium, calcium and ammonium lignosulphonate, butylnaphthalene sulphonate, and a mixture of the sodium salts of diisopropyl- and triisopropyl- naphthalene-sulphonic acid. Suitable agents of the non-ionic type include, for example, the condensation products of ethylene oxide with fatty alcohols such as oleyl alcohol and cetyl alcohol, or with alkyl phenols such as octylphenol, nonylphenol and octylcresol. Other non-ionic agents are the partial esters derived from long chain fatty acids and hexitol anhydrides, for example sorbitan monolaurate; the condensation products of the said partial esters with ethylene oxide; and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous solutions, dispersions or emulsions may be prepared by dissolving the active ingredient or ingredients in water or an organic solvent which may, if desired, contain one or more wetting, dispersing, or emulsifying agents and then, in the case when organic solvents are used, adding the mixture so obtained to water which may, if desired, likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

the compositions which are to be used in the form of aqueous solutions, dispersions or emulsions are generally supplied in the form of a concentrate containing a high proportion of the active ingredient or ingredients, and the concentrate is then diluted with water before use. These concentrates are usually required to withstand storage for prolonged periods and after such storage, to be capable of dilution with water in order to form aqueous preparations which remain homogeneous for a sufficient time to enable them to be applied by conventional spray equipment. In general, concentrates may conveniently contain from 10–85% and preferably from 25–60%, by weight of the active ingredient or ingredients. Dilute preparatins ready for use may contain varying amounts of the active ingredient or ingredients, depending upon the purpose for which they are to be used, and a dilute preparation containing between 0.01 and 10.0%, and preferably 0.1 and 1%, by weight of active ingredient or ingredients may normally be used.

The plant growth regulating effects of the compounds used in the process of the invention are manifested chiefly as a stunting or dwarfing effect in the plants to which they are applied. Such stunting or dwarfing may be useful, for example, in cereals, where reduction in stem growth may reduce the risk of lodging. Compounds which induce stunting or dwarfing may also be useful in stunting the growth of sugar cane thereby increasing the concentration of sugar in the cane at harvest. Some compounds, for example many of those listed in Table III, are active both by spray and by root application: others, for example, compounds 40 and 45 of Table I, are generally active by application to plant roots but not active, or active to a lesser degree, when sprayed on foliage; others again are active when sprayed on foliage, but not active, or active to a lesser degree, when applied for root uptake. Some compounds, for example 5-p-chlorophenyl-2-ethoxycarbonylmethyl tetrazole (compound No. 14 of Table I) inhibit the apices of growing plants when applied at appropriate rates, and may be used, for example, instead of hand topping to produce Brussels sprouts of more uniform size. Some compounds, for example compound No. 20 of Table I, may be used as chemical pruning agents to inhibit the growth of the apex and encourage the growth of lateral shoots in fruit trees, e.g. apple trees. Some compounds, for example compound No. 14 of Table I may be used to restrict the height or vegetative growth of peas: this can be useful in preventing lodging (weather damage) and easing mechanical harvesting. In carrying out the process of the invention, the amount of compound to be applied to regulate the growth of plants will depend upon a number of factors, for example the particular compound selected for use, and the identity of the plant species whose growth is to be regulated. However, in general, an application rate of from 0.01 to 10 kg per hectare is suitable, while from 0.1 to 2 kg per hectare is preferred for most purposes. However, on certain plants even application rates within these ranges may give undesired phytotoxic effects. In all cases routine tests are necessary to determine the best rate of application of a specific compound for any specific purpose for which it is suitable.

Compounds for use in the process of the invention having the formula:

wherein X represents hydrogen or a carboxyalkyl group, or a salt, ester, amide or nitrile thereof, may be prepared by known methods according to the following reaction scheme (see for example Buckler et al. J. Med. Chem. 1970. 13, 725)

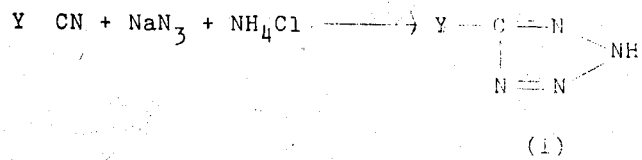

(I)

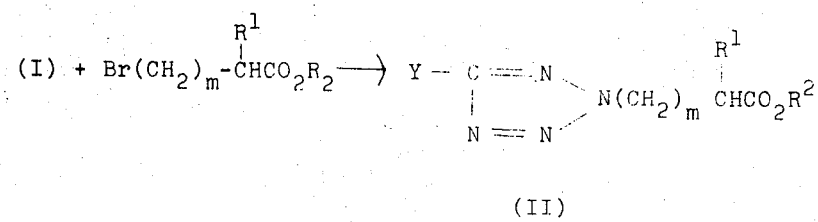

(II)

In the foregoing reaction scheme, Y has the meaning previously ascribed in this specification, $R^1$ is hydrogen or an alkyl group, $R^2$ is an esterifying group having preferably not more than 6 carbon atoms, and $m$ is 0 or an integer. The esters (II) can readily be converted to amides and thence to nitriles by standard methods. Alternatively, amides can be prepared directly by reaction of a 5-aryl tetrazole (I) with an amide of a halogen substituted aliphatic carboxylic acid. The esters (II) can be hydrolysed to the corresponding carboxylic acids by treatment with acid or alkali, according to standard methods. Where the ester (II) is a β-propionic acid derivative, that is to say when $m$ represents 1 and $R^1$ represents hydrogen in formula (II), acid hydrolysis is preferred, since under alkaline conditions the propionates tend to undergo a base catalysed reverse Michael type elimination of the 5-arytetrazole moiety.

Compounds of the formula:

wherein X is a carbalkoxy ester can be prepared by reaction of an alkoxycarbonyl halide with a tetrazole of formula (i) above as follows:

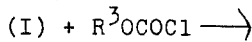

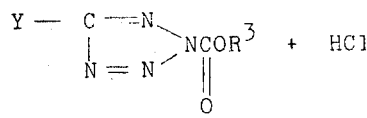

In the foregoing reaction scheme $R^3$ represents an alkyl radical. The reaction is preferably carried out in an aqueous medium and in the presence of a base such as sodium bicarbonate to neutralise the hydrogen chloride formed.

The invention will now be illustrated by the following Examples, in which, unless otherwise stated, parts are by weight and degrees are centigrade.

"Agral" and "Lissapol" are Trade Marks; Lissapol NX is a condensate of 1 mole of nonyl phenol with 8 moles of ethylene oxide; Agral 90 is a formulation of Lissapol NX containing industrial methylated spirit.

EXAMPLE 1

This Example illustrates the plant growth regulating properties of compounds used in the process of the invention. In the following test, the compounds were applied to the roots of test plants grown in flower pots which contained a quantity of sand. When the roots of the plants were established in this medium, the compound to be tested was dissolved or dispersed in 25 ml. of distilled water, so as to give a concentration of 500 parts per million. The 25 ml. of the aqueous composition so obtained was applied to saturate the sand within the pot and the plants were grown for 10 days. The reduction in size of treated plants as compared with untreated control plants was measured after 10 days and expressed as a percentage. The results are given in Table II below.

TABLE II

| Compound No of Table I | Plant Species | | | |
|---|---|---|---|---|
| | Wheat | Barley | Tomato | Brussels sprouts |
| 1 | 10 | 10 | 15 | 10 |
| 3 | 10 | 0 | 0 | + |
| 5 | 10 | 0 | 15 | 30 |
| 6 | 45 | 50 | 35 | 45 |
| 7 | 15 | 0 | 25 | 10 |
| 8 | 30 | 20 | 15 | 30 |
| 9 | 15 | 10 | 40 | + |
| 10 * | 10 | 10 | 10 | 0 |
| 46 | 40 | 15 | 40 | + |
| 47 | 0 | 0 | 0 | 15 |

* Applied at 300 ppm, not 500 ppm
+ Plants died

EXAMPLE 2

This Example illustrates the plant growth regulating activity of a further group of compounds used in the process of the invention. The compounds were tested according to the procedure described in Example 1 (i.e. by application to the roots of test plants) They were also tested by spraying them as aqueous solutions or dispersions on to test plants at the rate of 5 kilograms per hectare, in a volume equivalent to 1,000 litres per hectare. The percentage reduction in size of treated plants compared with untreated control plants was assessed after 10 days. Results are given in Table III.

TABLE III

| Compound No. of Table I | Root application | | | | Spray application | | | |
|---|---|---|---|---|---|---|---|---|
| | Wheat | Barley | Tomato | Brussels sprouts | Wheat | Barley | Tomato | Brussels sprouts |
| 2 | 30 | 30 | 25 | 70 | 0 | 0 | 20 | 10 |
| 4 | 0 | 0 | 20 | 30 | 15 | 0 | 15 | 15 |
| 11 | 10 | 0 | 0 | 20 | 0 | 0 | 15 | 15 |
| 12 | 15 | 0 | 0 | 40 | 10 | 0 | 35 | 0 |
| 13 | 60 | 20 | 20 | 40 | 25 | 0 | 15 | 0 |
| 14 | 20 | 25 | 20 | 0 | 25 | 10 | 20 | 30 |
| 15 | 20 | 15 | + | + | 20 | 0 | + | 0 |
| 16 | 0 | 0 | 0 | 10 | 10 | 0 | 20 | 0 |
| 17 | 20 | 0 | 0 | 0 | 15 | 10 | 0 | 30 |
| 18 | 15 | 0 | 50 | 50 | 0 | 0 | 20 | 10 |
| 19 | 20 | 0 | 60 | 20 | 20 | 0 | 60 | 0 |
| 20 | 40 | 10 | 30 | 30 | 25 | 0 | 30 | 45 |
| 21 | 10 | 10 | 10 | 0 | 10 | 0 | 20 | 25 |
| 22 | 10 | 0 | 0 | 15 | 0 | 0 | 0 | 25 |
| 23 | 15 | 15 | 35 | + | 0 | 0 | 15 | 0 |
| 26 | 10 | 10 | 20 | 40 | 0 | 0 | 0 | 15 |
| 27 | 0 | 15 | 0 | 0 | | | | |
| 24 | 20 | 0 | 20 | 15 | | | | |

TABLE III -Continued

| Compound No. of Table I | Root application | | | | Spray application | | | |
|---|---|---|---|---|---|---|---|---|
| | Wheat | Barley | Tomato | Brussels sprouts | Wheat | Barley | Tomato | Brussels sprouts |
| 38 | 40 | 30 | 15 | 20 | 20 | 15 | + | 30 |
| 39 | | | | | 40 | 20 | 15 | 0 |
| 40 | 20 | 70 | 30 | 20 | 0 | 0 | 0 | 0 |
| 41 | 30 | 20 | + | 30 | 20 | 15 | + | 30 |
| 42 | | | | | 10 | 0 | | |
| 43 | | | | | 20 | 10 | + | 20 |
| 37 | 20 | 10 | 30 | 20 | 0 | 0 | 0 | 0 |
| 44 | 15 | 15 | 0 | 0 | 0 | 0 | 20 | 30 |
| 48 | 0 | 0 | 0 | 15 | 0 | 0 | 40 | 30 |
| 49 | 50 | 15 | + | 15 | 30 | 20 | + | 20 |
| 51 | 0 | 0 | 0 | 15 | 0 | 0 | 0 | 20 |

+ Plants dead

EXAMPLE 3

This Example illustrates the preparation of 5-(2-chloropyridyl)tetrazole (compound No. 27 of Table I).

A mixture of 2-chloro-6-cyanopyridine (6.9 g.), sodium azide (3.4 g.) and ammonium chloride (3.0 g) in dry dimethylformamide (50 ml.) was heated at 90° for 20 hours. The dimethylformamide was stripped off in vacuo and the residue was dissolved in water (100 ml.). The tetrazole precipitated out upon acidification to pH1, was filtered off, and yielded the pure product (4.7 g.) as colourless needles (m.p. 132°–135°) on recrystallisation from aqueous ethanol.

EXAMPLE 4

This Example illustrates the preparation of compound No. 20 of Table I.

5-p-fluorophenyltetrazole (4.0 g.) was added to a solution of sodium (0.56 g.) in absolute ethanol (100 ml.). Ethyl bromoacetate (4.1.g) was added with stirring, and the reaction mixture was then heated under reflux for 24 hours. The solvent was removed in vacuo, the residue was taken up into ether (100 ml.) filtered and the ether removed under reduced pressure. The residual crude product was recrystallised from ethyl acetate/petroleum ether to give the ester (4.5. g.) as needles m.p. 93°–96°.

EXAMPLE 5

This example illustrates the preparation of compound No. 24 of Table I.

5-p-chlorophenyltetrazole (5.5 g.) was added to a solution of sodium (0.70 g.) in absolute ethanol (100 ml.) Chloroacetamide (2.86 g.) was added with stirring and the reaction mixture was then heated under reflux for 48 hours. The solvent was removed in vacuo and the residue recrystallised from 50% aqueous methanol to give the amide (2.6 g.) as colourless crystals (m.p. 235° dec.)

EXAMPLE 6

This Example illustrates the preparation of compound No. 38 of Table I.

5-p-chlorophenyl-2H-tetrazole-2-acetamide (2.5 g.) (Compound No. 20 of Table I) was dissolved in dry pyridine (30 ml.) and the solution cooled to 0°. Phosphoryl chloride (2.5 g.) was added dropwise with stirring at below 5°., and when the addition was complete the mixture was allowed to warm slowly to room temperature. After 2 hours, the mixture was of into 100 g. o crushed ice, acidified to pH1 and the precipitated solid filtered and recrystallised from aqueous ethanol to give the nitrile (1.5. g.) as colourless needles m.p. 108°–110°.

EXAMPLE 7

This Example illustrates the preparation of compound No. 23 of Table I.

5-p-chlorophenyltetrazole (8.0 g.) was added to a solution of sodium hydroxide (1.8 g.) in water (100 ml.) The solution was cooled to 0° and ethyl chloroformate (4.8 g.) was added dropwise with vigorous stirring. The stirred mixture was allowed slowly to attain room temperature, the precipitated solid was filtered off, washed well with water, dried and recrystallised from petroleum ether 60/80 to give the product as colourless crystals (8.0 g. m.p. 72°–73°).

Other compounds shown in Table I are prepared by methods analogous to those of Examples 3–7.

EXAMPLE 8

Young sugar cane plants were grown from single-eyed cuttings and planted singly into 4-inch pots filled with potting compost. When they had reached an average stem length of 188 mm, measured from soil level to the base of the last exposed leaf ligule, four of the plants were sprayed with Compound No. 14 at a rate equivalent to 5 kg/ha in a spray volume of 1,000 litres/ha. Eight similar plants were retained untreated as controls. Their stem length was similarly assessed.

13 days and 28 days after treatment, the stem length of treated plants and controls was again measured. The stem growth since treatment was calculated by subtracting the initial stem heights from these figures.

As will be seen from the following table, treatment with Compound No. 14 reduced the stem growth of sugar cane by 43% after 13 days and 20% after 20 days.

| Treatment | Mean stem growth (mm) | |
|---|---|---|
| | After 13 days | After 28 days |
| Compound No. 14 5 kg/ha | 28 | 81 |
| Untreated controls | 49 | 101 |

EXAMPLE 9

The stems and leaves on one discreet branch of each of several large mature apple trees (variety Bismark) planted in an orchard in Sussex, were sprayed with compounds Nos. 14 and 20 and also with a 1:2 mixture of compounds No. 13 and 43. Formulations of each chemical or mixture of chemicals were suspended or dissolved in an aqueous solution of 0.1% Agral 90 wetting agent to give rates of 500, 1,000 and 2,000 ppm. The preparations were sprayed onto the branches to run-off. Each treatment was applied on June 12, 1972 to single branches on each of two separate trees.

Branches on four other trees were left untreated as controls.

Shortly before spraying 10 growing shoots on each branch were marked and measured for length. The length of these same shoots was then re-measured 31 days after spraying when it was found that all the chemicals had stunted vegetative growth at the main shoot apex and induced an increased production of lateral shoots. The degree of growth inhibition on main shoots which was produced is shown in the following table.

| Chemical Applied | | Mean reduction in shoot length compared with shoots on control branches % |
|---|---|---|
| Compound No. | Rate (ppm) | |
| 14 | 500 | 94 |
| | 1000 | 100 |
| | 2000 | 96 |
| 20 | 500 | 88 |
| | 1000 | 100 |
| | 2000 | 100 |
| 13+43 (1:2) | 500 | 97 |
| | 1000 | 79 |
| | 2000 | 96 |

EXAMPLE 10

Plots (size 12 m × 4 m) of Brussels sprouts of the varieties Frigostar, Peer Gynt and Topscore were grown in a field in Berkshire. When the plants had reached the following average stem heights:

| Peer Gynt | 39 cm |
| Frigostar | 37 cm |
| Topscore | 30 cm | they were sprayed with compound No. 14 at rates equivalent to 2, 1, 0.5 and 0.25 kg/ha. on Aug. 10, 1972. Some plots were left untreated as controls. There were 3 replicate plots per treatment.

Suspensions of the active ingredient were prepared by adding the appropriate quantity of a dispersible grain formulation to a solution of 0.1% Agral 90 in water and stirring. Sprays were applied at the equivalent of 400 litres/ha.

105 days after treatment it was noticed that growth at the stem apex of treated plants had been markedly retarded. Sprout buttons were picked from 10 plants in each of the control and treated plots at this time. Results given in the following table show that plants of all three varieties treated with compound No. 14 gave substantially higher yields of sprouts than the untreated controls.

| Rate of Compound No. 14 kg/ha | Mean fresh wt. of sprouts per plant (g) | | |
|---|---|---|---|
| | Topscore | Peer Gynt | Frigostar |
| 2 | 303 | 321 | 279 |
| 1 | 300 | 302 | 296 |
| 0.5 | 292 | 297 | 229 |
| 0.25 | 294 | 316 | 224 |
| Control untreated | 237 | 223 | 196 |

EXAMPLE 11

Within a field of peas (variety Maro) grown for processing, plots of 2m × 3m were marked out. On May 17, 1972, when the average stem height of the plants was 10.6 cm, some plots were sprayed with compound No. 14 at rates equivalent to 2,1 and 0.5 kg/ha. Other similar plots were left untreated as controls. There were 3 replicate plots per treatment and 9 control plots.

Emulsions of the active ingredient were prepared by adding the appropriate quantity of an emulsifiable concentrate formulation to a solution of 0.1% Lissapol NX in water, and shaking. Sprays were applied at the eqivalent of 400 litres/ha.

The stem length of 10 plants in each plot was measured at 33 and 68 days after treatment. As is shown in the following table, treatment of the pea plants with compound No. 14 significantly reduced plant height and it was noticed at the time of the second height measurement that the treated plots had not lodged as much as the taller controls.

| Rate of Compound No. 14 applied kg/ha | % reduction in growth compared to untreated plants | |
|---|---|---|
| | Days after treatment | |
| | 33 | 68 |
| 2 | 18 | 12 |
| 1 | 11 | 11 |
| 0.5 | 3 | 4 |

Pods were harvested from an area of 1m$^2$ with each plot at 97 days after treatment and the peas were shelled, dried and weighed. There were no significant differences between the dry weights of peas from treated and control plots.

EXAMPLE 12

3-Year old plum rootstocks (variety Myrobalan B) planted in the field as separate trees and about 1.5 m in total height, were sprayed with compounds No. 14 and No. 20 and also with a 1:2 mixture of compounds No. 13 and No. 43. Formulations of each chemical or mixture of chemicals were suspended or dissolved in an aqueous solution of 0.1% Agral 90 wetting agent to give rates of 500, 1000 and 2000 ppm (W/V). The preparations were sprayed onto the trees to run-off (the point when excess aqueous preparation just began to drip off the leaf surfaces). Each treatment was applied on June 16, 1972, to two trees, while four other trees were left untreated as controls.

Shortly before spraying 10 growing shoots on each tree were marked and their lengths measured. These same shoots were then measured again 29 days after treatment, when it was found that all the chemicals had caused pronounced retardation of vegetative shoot growth, as is shown in the following Table.

| Compound No. | Rate ppm | Average reduction (%) in shoot length compared with controls |
|---|---|---|
| 14 | 500 | 84 |
| | 1000 | 85 |
| | 2000 | 85 |
| 20 | 500 | 41 |
| | 1000 | 77 |
| | 2000 | 98 |
| 13 + 43 (1:2) | 500 | 75 |
| | 1000 | 92 |
| | 2000 | 99 |

The stunting, which was due to an inhibition of growth at the shoot apex, resulted in the production by the treated trees of more short lateral shoots than were produced on controls.

EXAMPLE 13

Plots (sized 3m × 2m) were marked out on winter wheat of 3 varieties (Maris Ranger, Cama and Joss Cambier) which had been drilled into the field in rows 18 cm apart in the autumn of 1970.

In April 1971 when individual wheat seedlings were at the sixth leaf stage and had an average stem length of 6–9 cm (measured from soil level to the last visible ligule) some of the plots were sprayed with compound No. 14 of Table I, at rates equivalent to 2 and 4 kg/ha. Four other plots per variety were left untreated as controls. There were 2 replicate plots of each treatment on each variety of wheat.

Aqueous emulsions of compound number 14 were prepared for spraying by adding an appropriate volume of a 20 per cent emulsifiable concentrate formulation to a solution of 0.1 per cent Agral 90 wetting agent in water and agitating the mixture. The volume of the emulsions sprayed onto the plots of wheat plants was equivalent to 400 litres/ha.

The stem length of 10 randomly chosen plants in each plot was measured 33 and 50 days after treatment, when it was found that plants sprayed with compound No. 14 were noticeably shorter than untreated plants, although they had shown no sign of phytotoxicity at any stage of growth. The increases in stem length since the time of spraying which were computed are given in the following table and demonstate the effect which was noticed in the field.

Increases in stem length (cm) since treatment

| Treatment | Days from spraying | Variety | | |
|---|---|---|---|---|
| | | Maris Ranger cm | Cama cm | Joss Cambier cm |
| Compound No. 14 | | | | |
| 2kg/ha | 32 | 42 | 41 | 42 |
| 4kg/ha | 32 | 40 | 41 | 39 |
| Control, | | | | |
| untreated | 32 | 54 | 49 | 50 |
| Compound No. 14 | | | | |
| 2kg/ha | 50 | 66 | 69 | 75 |
| 4kg/ha | 50 | 60 | 62 | 63 |
| Control, | | | | |
| untreated | 50 | 79 | 81 | 80 |

Short wheat plants are less liable to lodge than tall plants. Although it is difficult to demonstate lodging resistance in small plots, it was noticed that none of the plants treated with compound No. 14 had fallen at harvest, whereas several other plots in the same field contained lodged plants.

EXAMPLE 14

This Example illustrates an atomisable fluid comprising a mixture consisting of 25% by weight of Compound No. 14 of Table I and 75% by weight of xylene.

EXAMPLE 15

This Example illustrates a dusting powder which may be applied directly to plants and comprises 1% by weight of compound No. 14 of Table I and 99% by weight of talc.

EXAMPLE 16

25 Parts by weight of compound No. 14 of Table I, 65 parts by weight of xylene, and 10 parts of an alkyl aryl polyether alcohol ("Triton" X-100; Triton is a Trade Mark) were mixed in a suitable mixer. There was thus obtained an emulsion concentrate which can be mixed with water to produce an emulsion suitable for use in agricultural applications.

EXAMPLE 17

10 Parts by weight of compound No. 14 of Table I, 10 parts of Lissapol NX; and 80 parts by weight of diacetone alcohol were thoroughly mixed. There was thus obtained a concentrate which, on mixing with water, gave an aqueous dispersion suitable for application to plants as a spray.

EXAMPLE 18

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44-100, to obtain the desired size of grains

| | % wt |
|---|---|
| Compound No. 14 (Table I) | 50 |
| Dispersol T | 12.5 |
| (Trade Mark for a mixture of sodium sulphate and a condensate of formaldehyde with the sodium salt of naphthalene sulphonic acid) | |
| Calcium lignosulphonate | 5 |
| Sodium dodecylbenzenesulphonate | 12.5 |
| Sodium acetate | 20 |
| | 100% |

We claim:
1. A method of stunting the growth of plants, which comprises applying to the locus thereof in an amount sufficient to stunt the growth thereof a compound of the formula:

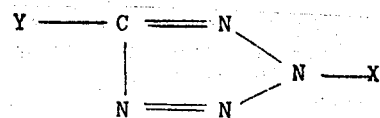

wherein Y is phenyl or substituted phenyl wherein the substituent is selected from the group consisting of $C_1$ to $C_4$ alkyl, halogen, cyano and nitro; and X is hydrogen, hydroxyalkyl or carboxyalkyl of 2–5 carbons, $CO.OCH_3$, $CO.OC_2H_5$, $CO.OC_6H_5$ and $CO.O.CH_2C_6H_4Cl$.

2. A method of claim 1 wherein the compound applied is the ethyl ester of 5-(4-chlorophenyl) tetrazolylacetic acid.

3. The method of claim 1 wherein the compound is applied for uptake by plant foliage.

4. The method of claim 1 wherein the compound is applied for uptake by plant roots.

5. The method of claim 1 wherein Brussels sprouts are treated between 5 and 16 weeks before harvest in an amount sufficient to inhibit the apices thereof but insufficient to damage substantially other parts of the plants.

6. The method of claim 1 wherein the compound is applied to fruit trees in an amount sufficient to inhibit apical growth and to encourge lateral growth.

7. The method of claim 1 wherein the compound is applied to sugar cane in an amount sufficient to stunt the growth thereof.

* * * * *

UNITED STATES PATENT OFFICE
CERTIFICATE OF CORRECTION

Patent No. 3,865,570                    Dated February 11, 1975

Inventor(s) Edwin Francis George and William Duncan Riddell

It is certified that error appears in the above-identified patent and that said Letters Patent are hereby corrected as shown below:

<u>In the heading of the patent</u>, add priority data as follows:

--[30]  Foreign Application Priority Data

February 28, 1972    Great Britain....9035/72--

Signed and sealed this 1st day of July 1975.

(SEAL)
Attest:

RUTH C. MASON
Attesting Officer

C. MARSHALL DANN
Commissioner of Patents
and Trademarks